(12) United States Patent
Stolyarov et al.

(10) Patent No.: US 10,727,537 B2
(45) Date of Patent: Jul. 28, 2020

(54) ELECTROCHEMICAL DEVICES COMPRISING NANOSCOPIC CARBON MATERIALS MADE BY ADDITIVE MANUFACTURING

(71) Applicant: GRAPHENE 3D LAB INC., Calverton, NY (US)

(72) Inventors: Daniel Stolyarov, Baiting Hollow, NY (US); Elena Polyakova, Baiting Hollow, NY (US); Irina Pomestchenko, Mt. Sinai, NY (US)

(73) Assignee: G6 Materials Corp.

( * ) Notice: Subject to any disclaimer, the term of this patent is extended or adjusted under 35 U.S.C. 154(b) by 339 days.

(21) Appl. No.: 15/508,170

(22) PCT Filed: Aug. 28, 2015

(86) PCT No.: PCT/US2015/047516
§ 371 (c)(1),
(2) Date: Mar. 2, 2017

(87) PCT Pub. No.: WO2016/036607
PCT Pub. Date: Mar. 10, 2016

(65) Prior Publication Data
US 2017/0346129 A1   Nov. 30, 2017

Related U.S. Application Data

(60) Provisional application No. 62/044,871, filed on Sep. 2, 2014.

(51) Int. Cl.
*H01M 4/00* (2006.01)
*H01M 10/058* (2010.01)
(Continued)

(52) U.S. Cl.
CPC .......... *H01M 10/058* (2013.01); *B33Y 80/00* (2014.12); *H01G 11/10* (2013.01); *H01G 11/32* (2013.01);
(Continued)

(58) Field of Classification Search
CPC ....... H01G 11/32; H01G 1/56; H01M 4/0402; H01M 4/0471; H01M 4/485
See application file for complete search history.

(56) References Cited

U.S. PATENT DOCUMENTS 2,702,250 A  2/1955  Miller
3,558,411 A  1/1971  Beelien
(Continued)

FOREIGN PATENT DOCUMENTS

WO   WO2013010211   1/2013
WO   WO 2014/015994  1/2014
(Continued)

OTHER PUBLICATIONS

International Search Report and Written Opinion of the International Search Authority (dated Jan. 11, 2016) for PCT/US15/047516 12 pages.
(Continued)

*Primary Examiner* — Cynthia H Kelly
*Assistant Examiner* — Monique M Wills
(74) *Attorney, Agent, or Firm* — Mark Malek; Paul J. Ditmyer; Widerman Malek PL

(57) ABSTRACT

Electrochemical devices, such as batteries, supercapacitors, etc., which may be prepared from nanoscopic electrically conductive carbon materials, and optionally electrochemically active materials. Also, methods for preparing such electrochemical devices, including components, elements, etc., of such devices by using three-dimensional (3D) print-
(Continued)

ing, fused deposition modeling (FDM), selective laser sintering (SLS), etc., techniques.

35 Claims, 2 Drawing Sheets

(51) Int. Cl.
| | | |
|---|---|---|
| H01G 11/36 | (2013.01) | |
| H01G 11/48 | (2013.01) | |
| H01G 11/50 | (2013.01) | |
| H01G 11/86 | (2013.01) | |
| H01M 4/485 | (2010.01) | |
| H01M 4/505 | (2010.01) | |
| H01M 4/525 | (2010.01) | |
| H01M 4/62 | (2006.01) | |
| H01M 4/04 | (2006.01) | |
| H01G 11/32 | (2013.01) | |
| B33Y 80/00 | (2015.01) | |
| H01G 11/10 | (2013.01) | |
| H01G 11/40 | (2013.01) | |
| H01G 11/52 | (2013.01) | |
| H01M 4/58 | (2010.01) | |
| H01M 10/0525 | (2010.01) | |
| H01M 10/0565 | (2010.01) | |
| H01M 10/052 | (2010.01) | |
| H01G 11/56 | (2013.01) | |
| H01G 11/62 | (2013.01) | |

(52) U.S. Cl.
CPC .............. *H01G 11/36* (2013.01); *H01G 11/40* (2013.01); *H01G 11/48* (2013.01); *H01G 11/50* (2013.01); *H01G 11/52* (2013.01); *H01G 11/86* (2013.01); *H01M 4/0402* (2013.01); *H01M 4/485* (2013.01); *H01M 4/505* (2013.01); *H01M 4/525* (2013.01); *H01M 4/5825* (2013.01); *H01M 4/622* (2013.01); *H01M 4/623* (2013.01); *H01M 4/625* (2013.01); *H01M 10/0525* (2013.01); *H01M 10/0565* (2013.01); *H01G 11/56* (2013.01); *H01G 11/62* (2013.01); *H01M 4/0471* (2013.01); *H01M 4/628* (2013.01); *H01M 10/052* (2013.01); *Y02E 60/13* (2013.01); *Y02T 10/7022* (2013.01)

(56) References Cited

U.S. PATENT DOCUMENTS

| | | | |
|---|---|---|---|
| 5,518,680 | A | 5/1996 | Cima et al. |
| 6,451,895 | B1 | 9/2002 | Topolkareaev et al. |
| 6,475,663 | B1 | 11/2002 | Mohwald et al. |
| 6,790,403 | B1 | 9/2004 | Priedeman, Jr. et al. |
| 7,285,506 | B2 | 10/2007 | Mardilovich et al. |
| 7,582,328 | B2 | 9/2009 | Rupich et al. |
| 8,114,375 | B2 | 2/2012 | Jang et al. |
| 8,168,964 | B2 | 5/2012 | Hiura et al. |
| 8,222,190 | B2 | 7/2012 | Zharmu et al. |
| 8,222,321 | B2 | 7/2012 | Youm et al. |
| 8,257,867 | B2 | 9/2012 | Liu et al. |
| 8,287,699 | B2 | 10/2012 | Shamu et al. |
| 8,367,035 | B2 | 2/2013 | Rogers et al. |
| 8,487,296 | B2 | 7/2013 | Grebel et al. |
| 8,551,806 | B2 | 10/2013 | Rueckes et al. |
| 8,557,442 | B2 | 10/2013 | Liu et al. |
| 8,563,169 | B2 | 10/2013 | Liu et al. |
| 8,563,348 | B2 | 10/2013 | Harris et al. |
| 8,587,093 | B2 | 11/2013 | Mardilovich et al. |
| 8,628,167 | B2 | 1/2014 | Nomura et al. |
| 8,665,479 | B2 | 3/2014 | Tan et al. |
| 8,696,938 | B2 | 4/2014 | Zhamu et al. |
| 8,697,485 | B2 | 4/2014 | Crain et al. |
| 8,708,685 | B2 | 4/2014 | Hickerson et al. |
| 8,722,430 | B2 | 5/2014 | Odagawa et al. |
| 8,741,486 | B1 * | 6/2014 | Jacobsen ............. H01M 2/1613 429/236 |
| 8,747,097 | B2 | 6/2014 | Pettis |
| 2002/0160271 | A1 * | 10/2002 | Frech ................. B01D 67/0088 429/314 |
| 2003/0011103 | A1 | 1/2003 | Swanson et al. |
| 2003/0062257 | A1 * | 4/2003 | Gozdz ...................... H01G 9/02 204/252 |
| 2003/0236588 | A1 | 12/2003 | Jang et al. |
| 2007/0191526 | A1 | 8/2007 | Jordan et al. |
| 2007/0290410 | A1 | 12/2007 | Koo et al. |
| 2009/0104386 | A1 | 4/2009 | Barrera et al. |
| 2009/0283511 | A1 * | 11/2009 | Wang ...................... H01C 7/02 219/505 |
| 2009/0286894 | A1 | 11/2009 | Cooper-White |
| 2010/0170626 | A1 | 7/2010 | Lochtman et al. |
| 2010/0219381 | A1 | 9/2010 | Jeschke et al. |
| 2011/0037033 | A1 | 2/2011 | Green |
| 2011/0049437 | A1 | 3/2011 | Crain et al. |
| 2011/0136007 | A1 * | 6/2011 | Zhamu ................ H01M 4/0471 429/209 |
| 2011/0171364 | A1 | 7/2011 | Xing et al. |
| 2011/0260116 | A1 | 10/2011 | Plee et al. |
| 2011/0272646 | A1 | 11/2011 | Meyer |
| 2012/0219841 | A1 * | 8/2012 | Bolandi .................. C23C 26/00 429/144 |
| 2012/0244333 | A1 | 9/2012 | Aksay et al. |
| 2013/0316072 | A1 | 11/2013 | Scordilis-Kelley et al. |
| 2013/0320673 | A1 | 12/2013 | Buchanan et al. |
| 2014/0034214 | A1 | 2/2014 | Boyer et al. |
| 2014/0072833 | A1 | 3/2014 | Loganathan et al. |
| 2014/0134335 | A1 | 5/2014 | Pridoehl et al. |
| 2014/0323847 | A1 | 10/2014 | McCool |
| 2015/0228980 | A1 * | 8/2015 | Huang ................ H01M 4/0404 429/213 |

FOREIGN PATENT DOCUMENTS

| | | |
|---|---|---|
| WO | WO 2014/041323 | 3/2014 |
| WO | WO 2014/210584 | 12/2014 |
| WO | WO 2015/156877 | 11/2015 |
| WO | WO 2016/140906 | 9/2016 |
| WO | WO 2017/019511 | 2/2017 |

OTHER PUBLICATIONS

International Search Report and Written Opinion of the International Search Authority (dated Nov. 30, 2015) for PCT/US15/011878, 10 pages.

International Search Report (ISR) and Written Opinion of the International Search Authority (WOISA) (dated Oct. 24, 2014) for PCT/US14/044768, 14 pages.

International Search Report (ISR) and Written Opinion of the International Search Authority (WOISA) (dated May 6, 2016) for PCT/US16/020031, 13 pages.

International Search Report (ISR) and Written Opinion of the International Search Authority (WOISA) (dated Nov. 29, 2016) for PCT/US16/043575, 15 pages.

Roy-Mayhew, "Functionalized Graphene Sheets in Dye-Sensitized Solar Cell Counter Electrodes," ACS Applied Materials & Interfaces, May 1, 2012 (2013 Dissertation), pp. 1-151.

"Graphene," Wikipedia at: http://en.wikipedia.org/wiki/Graphene, last checked May 15, 2014 (37 pages).

* cited by examiner

ELECTROCHEMICAL DEVICES COMPRISING NANOSCOPIC CARBON MATERIALS MADE BY ADDITIVE MANUFACTURING

This application is a national stage application of PCT Application Serial Number PCT/US15/047516, filed Aug. 28, 2015, which makes reference to and claims the priority benefit of U.S. Provisional Patent Application No. 62/044,871, filed Sep. 2, 2014, the entire disclosure and contents of said PCT Application and said U.S. Provisional Patent Application being hereby incorporated by reference in their entirety.

FIELD OF THE INVENTION

The present invention relates to electrochemical devices, such as batteries, supercapacitors, etc., which may be prepared from nanoscopic electrically conductive carbon materials, and optionally electrochemically active materials. The present invention further relates to methods for preparing such electrochemical devices, including components, elements, etc., of such devices by using three-dimensional (3D) printing, fused deposition modeling (FDM), selective laser sintering (SLS), etc., techniques.

BACKGROUND

Sources of portable stored electrical power may be in the form of electrochemical devices. One such electrochemical power source is the battery. A battery may comprise one or more electrochemical cells which are capable of converting stored chemical energy into usable electrical energy. In a conventional battery, there are two electrodes, one being the cathode, the other being the anode, each of which may be connected to a current collector. Depending upon whether the battery is consuming or providing electrical power, the cathode and anode may be either a positive terminal or a negative terminal. For example, when a battery is discharging (providing) power, the cathode is provides the positive terminal of the battery, while the anode provides the negative terminal. Conversely, when a battery is recharging (consuming) power, the cathode provides the negative terminal of the battery, while the anode is the positive terminal of the battery. The electrolyte is positioned between anode and cathode allowing ions move between terminals enabling flow of electric current.

Batteries also often include an electrolyte which is sufficiently ionized to conduct an electric current between the respective electrodes. The electrolyte may be presented in a liquid, solid, or semi-solid (gel) form, and may also require a separator/membrane within the electrolyte to prevent the battery from short-circuiting. Batteries may also comprise half-cells in which different electrolytes are present. As such, batteries may also be classified as being either primary batteries (i.e., are non-rechargeable or "disposable") or secondary batteries (i.e., may be recharged and reused).

Another example of an electrochemical device which may be used to provide electrical power is an electrochemical capacitor, often referred to as a "supercapacitor." Similar to batteries, supercapacitors comprise two electrodes in contact with an electrolyte between these electrodes. This electrolyte may also be a solid, liquid, gel, etc. In supercapacitors, these two electrodes may also be separated by an ion permeable separator (e.g., membrane). At the interface of each electrode with the electrolyte is formed a double layer, known as Helmholz double layer. In supercapacitors, the primary electrical current storage occurs at each of these Helmholz double layer interfaces. One of the advantages of supercapacitors (relative to conventional batteries) is the ability of such supercapacitors to store and deliver energy at rates far beyond those attainable by conventional batteries. In addition, the longer life cycle of supercapacitors, as well as the higher charge/discharge rate at higher power densities enable the use such supercapacitors in power back-up systems, consumer portable devices, electrical/hybrid automobile, construction machinery, etc.

SUMMARY

In a first broad aspect of the present invention, there is provided an electrochemical device comprising an electrochemical cell, each electrochemical cell including two half-cells, each half-cell comprising:
  an electrode comprising;
    a polymer matrix;
    at least one nanoscopic electrically conductive carbon material substantially uniformly dispersed in the polymer matrix; and
    at least one electrochemically active material substantially uniformly dispersed in the polymer matrix; and
  at least one electrolyte in contact with the electrode in each half-cell;
  wherein the electrode of one of the half-cells is the cathode, and wherein the electrode of the other of the half cells is the anode.

In a second broad aspect of the present invention, there is provided an electrochemical device comprising an electrochemical capacitor, the electrochemical capacitor comprising:
  two electrodes, each electrode comprising:
    a polymer matrix; and
    at least one nanoscopic electrically conductive carbon material substantially uniformly dispersed in the polymer matrix; and
  an electrolyte in contact with each of the two electrodes;
  wherein one of the electrodes is the cathode, and wherein the other electrode is the anode.

In a third broad aspect of the present invention, there is provided a method for preparing a battery electrode, which comprises the following steps of:
  (a) providing an electrode-forming composition comprising:
    at least one polymer;
    at least one nanoscopic electrically conductive carbon material; and
    at least one electrochemically active material; and
  (b) by using a three-dimensional (3D) printing technique, a fused deposition modeling (FDM) technique, or a selective laser sintering (SLS) technique, forming the electrode-forming composition of step (a) into a functional electrode comprising a polymer matrix having substantially uniformly dispersed therein the at least one nanoscopic electrically conductive carbon material and the at least one electrochemically active material.

BRIEF DESCRIPTION OF THE DRAWINGS

The invention will be described in conjunction with the accompanying drawings, in which.

DETAILED DESCRIPTION

Figure 1:
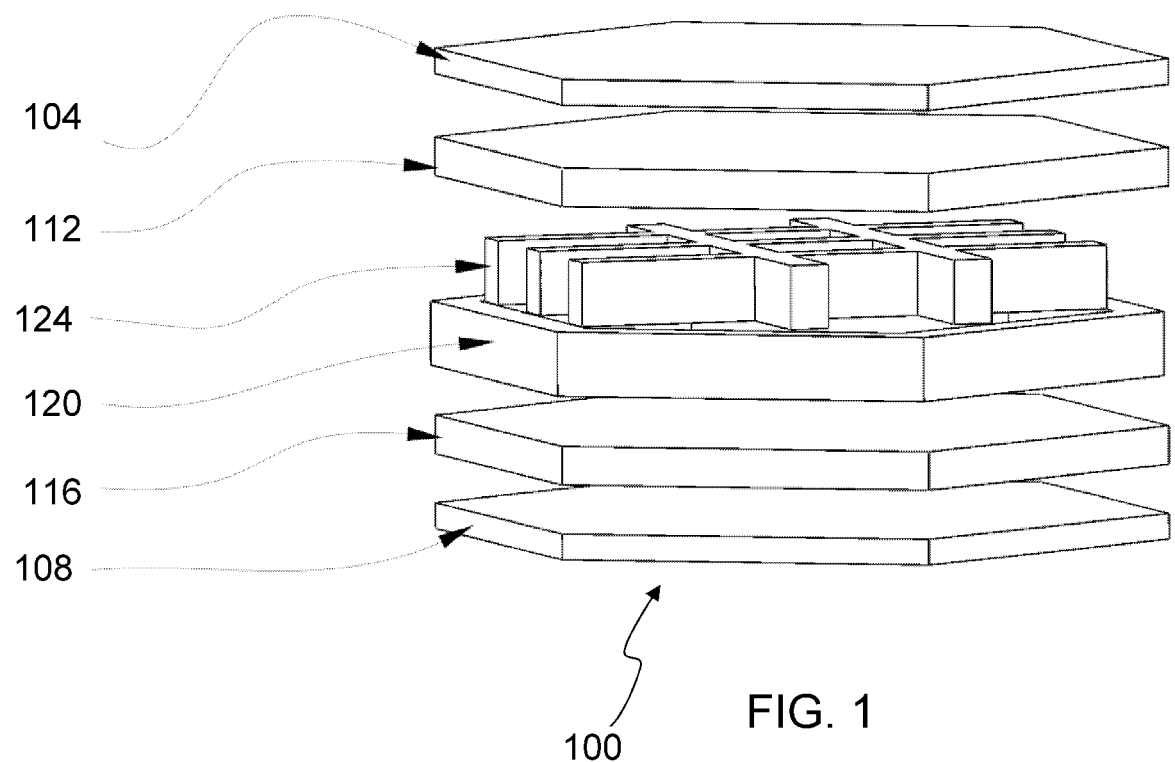
FIG. 1 is an exploded schematic illustration of an embodiment of a battery according to the present invention prepared by a three-dimensional (3D) printing technique.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "outer," "inner," "upper," "lower," "top," "bottom," "side," "front," "frontal," "forward," "rear," "rearward," "back," "trailing," "above," "below," "left," "right," "horizontal," "vertical," "upward," "downward," etc. are merely used for convenience in describing the various embodiments of the present invention. For example, the embodiments of the present invention illustrated in FIGS. 1 and 2 may be oriented in various ways.

For the purposes of the present invention, the term "electrochemical device" refers to a device which generates, stores, etc., electrical energy by, for example, electrochemical and/or electrostatic processes, mechanisms, etc. Electrochemical devices may include electrochemical cells, electrochemical capacitors (i.e., supercapacitors), etc.

For the purposes of the present invention, the term "electrochemical cell" refers to a device, component, element, etc., which is capable of generating electrical energy by an electrochemical reaction, etc., and which comprises two half-cells. Each half-cell comprises an electrode (i.e., either a cathode or an anode) and an electrolyte which may be the same electrolyte for both half-cells, or may be a different electrolyte for each half-cell. Examples of electrochemical cells may include batteries, galvanic cells, etc.

For the purposes of the present invention, the term "electrochemical capacitor" (also known as a "supercapacitor") refers to a device, component, etc., for storing electrical energy which comprise two electrodes in contact with an electrolyte (which may be a solid, liquid, gel, etc.) and may also be, in some embodiments, separated by an ion permeable separator (e.g., membrane), wherein a Helmholz double layer forms at the interface of each electrode with the electrolyte.

For the purposes of the present invention, the term "electrolyte" refers to a material, substance, composition, etc., which is sufficiently ionized (e.g., due to ionized salts dissolved in a liquid medium (such as water, as well as other solvents such as propylene carbonate, dimethyl sulfoxide (DMSO), dimethyl formamide (DMF), ethylene carbonate, diethyl carbonate, acetonitrile, sulfolane, γ-butyrolactone, etc.) ionized salts present in a gel or solid, etc.) to conduct an electrical current. Electrolytes may exist as liquids, solids, semi-solids (e.g., gels), etc. For example, in the case of solid (e.g., polymer-containing) electrolytes, the electrolyte may comprise one or more ionized salts such as: zinc chloride ($ZnCl_2$), ammonium chloride ($NH_4Cl$), etc., substantially uniformly dispersed therein.

For the purposes of the present invention, the term "battery" refers to an electrochemical device comprising one or more electrochemical cells that are capable of converting potentially available chemical energy into electrical energy. A battery may be a primary (i.e., single or "disposable" use) battery, or a secondary (i.e., rechargeable) battery.

For the purposes of the present invention, the term "electrode" refers, in the case of battery, to the electrochemically active terminal of a half-cell, and may be either the cathode (i.e., the terminal towards which positively charged cations flow), or the anode (i.e., the terminal towards which anions flow). In the case of an electrochemical capacitor, the term "electrode" refers to the electrically conductive components which are either the cathode or the anode, and which may (or may not) also be electrochemically active. Depending upon whether the electrochemical device is consuming or providing electrical power, the cathode and anode may be either a positive terminal or a negative terminal. For example, when a battery is discharging, the cathode is the positive terminal of the battery, while the anode is the negative terminal of the battery. Conversely, when a battery is recharging, the cathode is the negative terminal of the battery, while the anode is the positive terminal of the battery. The electrode may be in the form of one or more filaments, gels, powders, pellets, films, etc.

For the purposes of the present invention, the term "electrochemically active material" (also known interchangeably as "electroactive material") refers to a material which has the property, capability, etc., to participate in an electrochemical reaction so as to accept or release charges (electrons), and which may be used in preparing electrodes. Electrochemically active materials useful for electrodes may include, for example, certain metals such as, zinc, copper, aluminum, lead, cadmium, silver mercury, lithium, magnesium, etc., as well as certain metal salts such as manganese oxide ($MnO_2$), lithium iron phosphate ($LiFePO_4$), lithium titanate ($Li_4Ti_5O_{12}$), lithium cobalt oxide ($LiCoO_2$), lithium manganese oxide (LiMnO), lithium nickel manganese cobalt oxide ($LiNiMnCoO_2$), lithium nickel cobalt aluminum oxide ($LiNiCoAlO_3$), lithium manganese oxide ($LiMn_2O_4$), lithium nickel cobalt aluminum oxide ($LiNi_{0.8}Co_{0.15}M_{0.05}O_2$), lithium nickel manganese cobalt oxide ($LiNi_{1/3}Mn_{1/3}Co_{1/3}O_2$), etc.

For the purposes of the present invention, the term "current collector" refers to any electrically conductive material, component, element, etc., which is in contact with an electrochemically active material, or a component, element, etc., comprising an electrochemically active material.

For the purposes of the present invention, the term "electrically conductive material" refers to any which is capable of conducting, passing, etc., electrical current.

For the purposes of the present invention, the term "carbon material" material refers to materials made of carbon which may exist in nanoscopic form. Carbon materials may include one or more of: graphite; carbon black; graphene; graphene-like materials; (e.g., reduced graphene oxide, functionalized graphene, graphene oxide, partially reduced graphene oxide, graphite flakes; etc.); carbon-based nanofibers; carbon-based nanotubes; etc.

For the purposes of the present invention, the term "graphene-like material" refers to a material, substance, etc., which may have a layered structure the same or similar to graphene. Graphene-like materials may include one or more of: graphene; functionalized graphene; graphene oxide; partially reduced graphene oxide; graphite flakes; etc.

For the purposes of the present invention, the term "nanoscopic materials" refers to materials, etc., having a size in at least one dimension (e.g., thickness) of from about 1 to about 1000 nanometers, such as from about 1 to about 100 nanometers. Nanoscopic materials may include, for example, nanoplatelets, nanotubes, nanofibers, nanoparticulates, nanowhiskers, etc.

For the purposes of the present invention, the term "graphene" refers to pure or relatively pure carbon in the form of a relatively thin, nearly transparent sheet, which is one atom in thickness (i.e., a monolayer sheet of carbon), or comprising multiple layers (multilayer carbon sheets), having a plurality of interconnected hexagonal cells of carbon atoms which form a honeycomb like crystalline lattice structure. In addition to hexagonal cells, pentagonal and heptagonal cells (defects), versus hexagonal cells, may also be present in this crystal lattice. These graphene sheets may be relatively flat, may be deformed (e.g., bent, rolled, etc.), may be in the form of a plurality of interconnected sheets, etc.

For the purposes of the present invention, the term "functionalized graphene" refers to graphene which has incorporated into the graphene lattice a variety chemical functional groups such as —OH, —COOH, $NH_2$, etc., in order to modify the properties of graphene.

For the purposes of the present invention, the term "graphene oxide" (also known as "graphitic acid" and "graphite oxide") refers interchangeably to a compound of carbon, oxygen, and hydrogen which may exist in variable ratios of these three atoms, and which may be obtained by treating graphite with strong oxidizers.

For the purposes of the present invention, the term "partially reduced graphene oxide" refers to graphene oxide that, upon reduction, contains from about 5 about 30% oxygen by weight of the graphene oxide.

For the purposes of the present invention, the term "polymer matrix" refers to a matrix which provides the external or continuous (bulk) phase in which are dispersed one or more other materials, substances, etc., and which, besides the dispersed one or more other materials, substances, etc., comprise one or more polymers, as well as one or more other optional components, compounds, etc., such as plasticizers, surfactants, fillers, etc. Dispersion media may be a liquids, solids, etc. Suitable polymers for use in the polymer matrix may include, for example, one or more of: acrylate or methylmethacrylate polymers or copolymers, such as polyacrylates, polymethylmethacrylates, etc.; polylactic acid (PLA) polymers; polyhydroxyalkanoate (PHA) polymers, such as polyhydroxybutyrate (PHB); polycaprolactone (PCL) polymers; polyglycolic acid polymers; acrylonitrile-butadiene-styrene polymers (ABS); polyvinylidene fluoride polymers, polyurethane polymers, polyolefin polymers (e.g., polyethylene, polypropylene, etc.), polyester polymers, polyalkylene oxide polymers, such as polyethylene oxide (PEO), polyvinyl alcohol (PVA) polymers, polyamide polymers, polycarbonate polymers, high impact polystyrene (HIPS) polymers, etc. These polymers may be used in pure form or as a blend with each other or other components to serve as polymer matrix, as well as provide functionality, structural integrity, etc., to the electrode(s) and/or electrolyte of the electrochemical device.

For the purposes of the present invention, "plasticizer" refers to the conventional meaning of this term as an agent which, for example, softens, makes more flexible, malleable, pliable, plastic, etc., a polymer, thus providing flexibility, pliability, durability, etc., which may also decrease the melting and the glass transition temperature of the polymer, and which may include, for example, one or more of: tributyl citrate, diethyl phthalate, acetyl tributyl citrate, glycerol triacetate, glycerol tripropionate, triethyl citrate, acetyl triethyl citrate, triacetin, phosphate esters (e.g., triphenyl phosphate, resorcinol bis(diphenyl phosphate), oligomeric phosphate, etc.), long chain fatty acid esters, aromatic sulfonamides, hydrocarbon processing oil, glycerol, ethylene glycol, propylene glycol, trimethylene glycol, epoxy-functionalized propylene glycol, polyethylene glycol, polypropylene glycol, partial fatty acid ester (Loxiol GMS 95), glucose monoester (Dehydrat VPA 1726), epoxidized soybean oil, acetylated coconut oil, linseed oil, epoxidized linseed oil, etc.

For the purposes of the present invention, the term "fillers" refers to additives which may alter a composite's mechanical properties, physical properties, chemical properties, etc., and which may include, for example, one or more of: talc, magnesium oxide ($Mg(OH)_2$), hydrous magnesium silicate, aluminum oxides ($Al_2O_3$), silicon oxides ($SiO_2$), titanium oxides ($TiO_2$), calcium carbonate ($CaCO_3$), magnesium carbonate ($MgCO_3$), clay, chalk, boron nitride, limestone, diatomaceous earth, mica, glass quartz, ceramic and/or glass microbeads, metal or metal oxide fibers and particles, Magnetite®, magnetic Iron(III) oxide, etc.

For the purposes of the present invention, the term "impact modifiers" refers to additives which may increase a composite's resistance against breaking under impact conditions, and which may include, for example, one or more of: polymers or copolymers of an olefin, for example, ethylene, propylene, or a combination of ethylene and propylene, with various (meth)acrylate monomers and/or various maleic-based monomers; copolymers derived from ethylene, propylene, or mixtures of ethylene and propylene, as the alkylene component, butyl acrylate, hexyl acrylate, propyl acrylate, a corresponding alkyl(methyl)acrylates or a combination of the foregoing acrylates, for the alkyl(meth) acrylate monomer component, with acrylic acid, maleic anhydride, glycidyl methacrylate or a combination thereof as monomers providing an additional moieties (i.e., carboxylic acid, anhydride, epoxy); block copolymers, for example, A-B diblock copolymers and A-B-A triblock copolymers having of one or two aryl alkylene blocks A, which may be polystyrene blocks, and a rubber block, B, which may be derived from isoprene, butadiene or isoprene and butadiene; etc.

For the purposes of the present invention, the terms "graphene platelets" and "graphene sheets" refer interchangeably to platelets of graphene comprising one or more layers of a two-dimensional (2D) graphene plane, and may also refer to platelets and sheets comprised of graphene oxide, partially reduced graphene oxide, functionalized graphene, etc.

For the purposes of the present invention, the term "graphene nanoplatelets (NGPs)" and "nanosheets" refer interchangeably to platelets of graphene, and may also refer to platelets and sheets comprised of graphene oxide, partially reduced graphene oxide, functionalized graphene, etc., having a thickness in the range of from about 0.34 to about 100 nm.

For the purposes of the present invention, the term "graphene-like nanoplatelets" refers to graphene-like materials having platelet characteristics the same or similar to graphene nanoplatelets (NGPs).

For the purposes of the present invention, the term "flakes" refers to particles in which two of the dimensions (i.e., width and length) are significantly greater compared to the third dimension (i.e., thickness).

For the purposes of the present invention, the term "graphite flakes" refers to graphite material in the form of flakes.

For the purposes of the present invention, the term "closely-spaced stack-like arrangement" refers to an atomic arrangement in a crystalline phase wherein covalently or ionically bonded atoms form layered structures, which arrange themselves in close proximity and parallel to each other. These layers are weakly bound by Van der Waals forces For the purposes of the present invention, the term "substrate" refers to a base component of a composite and wherein other components may be blended with it, placed on its surface, etc.

For the purposes of the present invention, the term "powder" refers to a solid material which is comprise of a large number of fine particles.

For the purposes of the present invention, the term "film" refers to a relatively thin continuous layer of material, and which may be supported on or by other materials, or which may be unsupported on or by other materials.

For the purposes of the present invention, the term "solvent" refers to a liquid which may dissolve or suspend another material which may be a solid, gas, or liquid.

For the purposes of the present invention, the term "compatible solvent" refers to a solvent which may provide an effective medium for the formation of a solution or dispersion of one or more solutes without significant detrimental effects to the other components present in the solution or dispersion, e.g., is miscible.

For the purposes of the present invention, the term "low boiling solvent" refers to a solvent which boils at or near a temperature of about 100° C. or less. Suitable low boiling solvents for use herein may include, for example, one or more of: isopropanol (isopropyl alcohol); ethyl acetate; tetrahydrofuran (THF); acetonitrile; chloroform; methylene chloride; dichloromethane; acetone; etc.

For the purposes of the present invention, the term "high boiling solvent" refers to refers to a solvent which boils at or near a temperature of greater than about 100° C. Suitable high boiling solvents for use herein may include, for example, one or more of: dimethylformamide, N-dodecyl-pyrrolidone, N-formyl-piperidine, dimethylacetamide, dimethyl-imidazdinone N-methyl-pyrrolidone, N-octylpyrrolidone, N-ethyl-pyrrolidone, 3-(2-oxo-1-pyrolidinyl) propanenitrile, N-benzyl-pyrrolidone, N-butylpyrrolidone, dimethyl-tetrahydro-2-pyrimidinone, cyclohexyl-pyrrolidone, and N-vinyl pyrrolidone; etc.

For the purposes of the present invention, the term "blend," "blending," and similar words and/or phrases refers to combining, mixing together, unifying, etc., a plurality of components, compounds, compositions, substances, materials, etc.

For the purposes of the present invention, the term "substantially uniformly dispersed" refers to a dispersion of a material, substance, compound, etc., in the bulk (continuous) phase (e.g., polymer matrix) such that the bulk phase is substantially uniform in terms of composition, texture, characteristics, properties, etc.

For the purposes of the present invention, the term "low viscosity" refers to a material, liquid, melt, etc. which flows freely when poured, spread, mixed, etc.

For the purposes of the present invention, the term "composite" refers to multicomponent material wherein each component has, imparts, etc., a distinct function, property, etc., to the multicomponent material.

For the purposes of the present invention, the term "hybrid composite" refers to a composite comprising two or more components, constituents, etc., dispersed at the nanometer or molecular level in any solid or liquid media.

For the purposes of the present invention, the term "in situ" refers to the conventional chemical sense of a reaction that occurs "in place" in the reaction mixture.

For the purposes of the present invention, the term "exfoliation" refers to the chemical and/or physical process of separation of layers of a material (e.g., graphite flakes).

For the purposes of the present invention, the term "intercalation" refers to the to the process of insertion of atoms or molecules in between layers of layered structures. Intercalation may be a part of the exfoliation process.

For the purposes of the present invention, the term "percolation" refers to the process of formation of a continuous three-dimensional (3D) network.

For the purposes of the present invention, the term "continuous batch reaction" refers to a process in which a continuous flow of reagents may be supplied to the reactor and in which a continuous flow of resulting product(s) may be collected from the reactor during the course of the reaction.

For the purposes of the present invention, the term "solid" refers to refers to non-volatile, non-liquid components, compounds, materials, etc.

For the purposes of the present invention, the term "liquid" refers to a non-gaseous fluid components, compounds, materials, etc., which may be readily flowable at the temperature of use (e.g., room temperature) with little or no tendency to disperse and with a relatively high compressibility.

For the purposes of the present invention, the term "room temperature" refers to refers to the commonly accepted meaning of room temperature, i.e., an ambient temperature of from about 20° to about 25° C.

For the purposes of the present invention, the term "thermoplastic" refers to the conventional meaning of thermoplastic, i.e., a composition, compound, material, etc., that exhibits the property of a material, such as a high polymer, that softens or melts so as to become pliable when exposed to sufficient heat and generally returns to its original condition when cooled to room temperature.

For the purposes of the present invention, the term "thermoset" refers to the conventional meaning of thermoset i.e., a composition, compound, material, etc., that exhibits the property of a material, such as a polymer, resin, etc., that irreversibly cures such that it does not soften or melt when exposed to heat.

For the purposes of the present invention, the term "printed electronic circuitry" refers to electronic circuitry created by various printing methods or techniques such as, for example, flexography, gravure printing, offset lithography, inkjet printing, etc.

For the purposes of the present invention, the term "thin film batteries" refers to a battery formed from materials, some of which may be, for example, only nanometers or micrometers thick, thus allowing the finished battery to be only millimeters thick.

For the purposes of the present invention, the term "solar cell grid collectors" refers to the part of the solar cell, such as is made of metal or other conductive material, and which collects charges generated in/by semiconductor part of a solar cell.

For the purposes of the present invention, the term "photovoltaic devices" refers to devices such as solar panels, solar cells, etc., which generate electrical power by converting solar radiation into direct current electricity.

For the purposes of the present invention, the term "three-dimensional (3D) printing" (also known as "additive printing" and "additive manufacturing") refers to any of various processes (e.g., coating, spraying, depositing, applying, etc.) for making a three-dimensional (3D) object from a three-dimensional (3D) model, other electronic data source, etc., through additive processes in which successive layers of material may be laid down, for example, under computer control.

For the purposes of the present invention, the term "comprising" means various compounds, components, ingredients, substances, materials, layers, steps, etc., may be conjointly employed in embodiments of the present invention. Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various compositions, compounds, ingredients, components, elements, capabilities, steps, etc., may be employed in embodiments of the present invention.

For the purposes of the present invention, the term "module" refers to an isolatable element that performs a defined function and has a defined interface to other elements. These modules may be implemented in hardware, a combination of hardware and software, firmware, wetware (i.e., hardware with a biological element) or a combination thereof, all of which are considered to be functionally (e.g., behaviorally) equivalent.

Description

Three-dimensional (3D) printing technologies may enable incorporation of electronic components into a printed part, component, element, device, etc., in, for example, a one-step continuous process and may greatly benefit from the ability to use additive manufacturing technologies such as fused deposition modeling (FDM), stereo lithography (STL), selective laser sintering (SLS), etc., for providing, prototyping, etc., a variety of electronic devices. In some instances, the presence of integrated, rather than an external power supply may be needed. User-friendly additive manufacturing printing techniques, as well as readily available printers may enable one-pot assembly that translates into convenience and flexibility in prototyping, designing, etc.

As described below, components, elements, constituents, etc., for electrochemical devices, such as batteries, supercapacitors etc., in the form of filamentary (fiber), pellets, powders, particulates, etc., may be prepared by three-dimensional (3D) printers. The materials for these components, elements, constituents, etc., may be processed by FDM, SLS, or other related techniques which may require thermal stability, as well as acceptable physical and chemical stability. To impart acceptable thermal stability for each individual component, element, etc., the composite mixture may need to be selected so as to withstand the processing conditions under which it is processed.

In has been found that additive manufacturing for creating printable electronics, such as circuitry, may also be used in embodiments of the present invention to create electrical power sources, including, for example, three-dimensional (3D) printable electrochemical devices, such as batteries, supercapacitors, etc. Incorporation of various nanoscopic carbon-based materials (in particular nanoscopic graphene and graphene-like materials, as well as various carbon nanofibers, carbon nanotubes, etc.) which may provide exceptional mechanical strength, high electrical conductivity, etc.) into the compositions used for preparing electrodes in such electrochemical devices may also be provide improvement in the functionality, as well stability of such devices, including electrodes prepared by 3D printing and related manufacturing techniques such as FDM, SLS, etc. Graphene has one-layer thick 2D structure with a unique morphology in terms robustness, thermal and chemical stability, electrical and thermal conductivity, as well as flexibility, and which may be processed by 3D printing and related additive manufacturing techniques such as FDM, SLS, etc. These graphene and graphene-like materials which may be used in embodiments of the present invention may include single or multiple layer graphite or graphene nanoplatelets, reduced graphene oxide, carbon-based nanofibers, carbon-based nanotubes, carbon black, graphite, etc. Possessing improved specific surface area together with improved conductivity, graphene-based electrodes may outperform other carbon-based materials in terms of specific capacitance and power density. Unlike other high surface area materials such as activated carbon and carbon nanotubes, the effective surface area of graphene materials for usage in electrochemical capacitor electrodes does not depend upon the distribution of pores at solid state. By having improved surface area, graphene nanoplatelets may provide a tangible advantage in terms of an expanded Helmholtz double-layer the electrode-electrolyte interface, thus increasing the energy storage limits of such electrochemical devices. The energy density of graphene-based supercapacitors may be several orders of magnitude when compared to conventional dielectric capacitors. In particular, compared with various conventional liquid electrolytes, the polymer-based matrix of embodiments of the electrochemical devices of the present invention may offer advantages in terms of longer term integrity of the fabricated supercapacitors, thus potentially avoiding possible leakages if rupture of the packaging takes place, as well as providing a potential advantage when operating these devices in lower temperature regimes. These flexible polymer matrix frameworks may also allow for a great degree of device flexibility when used in roll-up displays and wearable electronics applications.

Embodiments of the electrochemical device of the present invention may be in the form of an electrochemical cell, each electrochemical cell including two half-cells, each half-cell comprising: an electrode; and at least one electrolyte in contact with the electrode in each half-cell, wherein the electrode of one of the half-cells is the cathode, and wherein the electrode of the other of the half cells is the anode. Each electrode comprises: a polymer matrix; at least one nanoscopic electrically conductive carbon material substantially uniformly dispersed in the polymer matrix (for example, in amounts in the range of from about 5 to about 40% by weight, such as from about 10 to about 30% by weight, of the polymer matrix); and at least one electrochemically active material substantially uniformly dispersed in the polymer matrix (for example, in amounts in the range of from about 5 to about 50% by weight, such as from about 10 to about 30% by weight, of the polymer matrix).

Embodiments of the electrochemical device of the present invention may also be in the form of an electrochemical capacitor, the electrochemical capacitor comprising: comprising: two electrodes; and at least one electrolyte in contact with each of the two electrodes, wherein one of the electrodes is the cathode, and wherein the other electrode is the anode. Each electrode comprises: a polymer matrix; and at least one nanoscopic electrically conductive carbon material substantially uniformly dispersed in the polymer matrix (for example, in amounts in the range of from about 10 to about 50% by weight, such as from about 20 to about 40% by weight, of the polymer matrix).

Embodiments of the method of the present invention for preparing a battery electrode may comprise step (a) of providing an electrode-forming composition (i.e., a multi-component polymer composite which may used to form a functional electrode by printing/depositing/etc.) comprising: at least one polymer (for example, in amount in the range of from about 40 to about 80% by weight of the electrode-forming composition); at least one nanoscopic electrically conductive carbon material (for example, in amount in the range of from about 10 to about 30% by weight of the electrode-forming composition); and at least one electrochemically active material (for example, in amount in the range of from about 10 to about 30% by weight of the electrode-forming composition). In step (b), the electrode-forming composition of step (a) is formed, by using a three-dimensional (3D) printing technique, a fused deposition modeling (FDM) technique, or a selective laser sintering (SLS) technique, into a functional electrode comprising a polymer matrix having substantially uniformly dispersed therein the at least one nanoscopic electrically conductive carbon material and the at least one electrochemically active material.

In some embodiments of the present invention, these polymer nano-composite electrodes may be in the form of filaments, gels, powders, pellets, films, etc., containing nanoscopic electrically conductive carbon material(s), along with other electrochemically active electrode materials, other optional electrodes additives, etc., which, along with, for example, the electrolytes, may be printed and/or deposited forming a functional electrical power source. For example, in embodiments of the present invention in the form of the batteries as well as supercapacitors, assembly may be achieved by utilizing single as well as multiple additive manufacturing techniques simultaneously or step-wise, as well as utilizing custom modifications where applicable in any desirable combination and/or sequence. For example, one or both electrodes in the electrical chemical device may be 3D printed from pellets, filaments, etc., and formed by FDM techniques, where electrolyte component being delivered as gel by a custom automated or manual syringe device, as well as by partial or complete assembly by FDM techniques simultaneously or stepwise, with or without subsequent introduction of other (optional) materials. Other embodiments may be represented by SLS-printed electrodes, in combination with gel or liquid, solid or polymer electrolyte component, with one electrode being printed by SLS techniques, the other by FDM techniques with liquid, solid, gel or polymer electrolytes, as well as other possible combinations, as previously described. The electrolyte may be constituted as single or multiple components that may be photopolymeried, electropolymerized, and/or thermo-polymerized in situ (along with or stepwise with the electrode assembly) on a printing platform, or prepared separately and added to the other constituents upon the final assembly of the electrochemical device. In other words, embodiments of the present invention may prepared by single or multiple additive manufacturing techniques, as well as any other modifications and combinations required for the assembly of such electrochemical devices, where functional components (i.e., electrodes, electrolyte, current collector, separator, etc., where applicable) may be delivered in any form (e.g., as filaments, powders, pellets, gels, liquids, solids, composite films, monomer(s)/initiator(s) blend for preparing polymerized components, elements, etc.) and in any combination and sequence.

One embodiment of the electrochemical devices of the present invention involves "building block" preparations and methods of, for example, an FDM fabrication of a modified 3D printed zinc-carbon (Zn—C) battery. In this embodiment a blend of polymer(s), plasticizer, nanoscopic electrically conductive carbon materials, and Zn powder may be used to create a polymer matrix composite which may be used to print an electrode in a printable battery. The additive manufacturing techniques utilized for such printing may include, for example, FDM techniques, SLS techniques, as well as appropriate modifications of such techniques. The other electrode material may be comprised of a blend of polymer(s), plasticizer, nanoscopic electrically conductive carbon materials, and $MnO_2$ nanoparticles. Both electrode composites may be processed by extrusion, thus yielding, for example, filaments which may be consequently fed into commercially available FDM 3D printers to build the electrodes of the printed battery. The electrolyte layer of the battery may be comprised of a polymer containing zinc chloride ($ZnCl_2$), ammonium chloride ($NH_4Cl$), etc., other optional ingredients, etc., in variable compositions and processed to the form of a filament(s) by the conventional extrusion methods. One or more other optional additives such as $SiO_2$, $Al_2O_3$, $TiO_2$, $Mg(OH)_2$, etc., may also be included in the electrodes and electrolyte composition as may be necessary. These electrode and electrolyte containing composites may be simultaneously or step-wise deposited/printed by the commercial or custom-made FDM printer to provide a functional battery upon completion.

Another embodiment of the present invention relates to lithium-ion (Li-ion) battery that may be manufactured by FDM techniques. In this embodiment of the present invention, the Li-ion battery assembly in the filamentary form may allow simplification in manufacturing the battery by employing an FDM printing method. For example, $Li_4Ti_5O_{12}$ (LTO) may be used as the primary material in one electrode filament composite, while $LiFePO_4$ (LFP) may be added to the other filament composite. One or more other optional additives such as $SiO_2$, $Al_2O_3$, $TiO_2$, $Mg(OH)_2$, etc., may also be included in the electrodes and electrolyte composition as may be necessary. The respective LTO and LFP electrochemically active materials may be blended into the polymer matrix, along with a plasticizer and nanoscopic electrically conductive carbon materials, and then extruded into a filamentary, pellet, etc., forms. The resulting filaments, pellet, etc., containing the electrode materials may be subsequently used to deposit/print battery electrodes in specially designed geometry in order to maximize the electrode surface area. A polymer electrolyte in the form of filament, gel, etc., may also be deposited/printed simultaneously or stepwise with electrode filaments to assemble an embodiment of a Li-ion battery. These Li-ion battery embodiments may also be printed by SLS, FDM, etc., as well as modifications of such techniques simultaneously or stepwise in any combination.

In some embodiments of the present invention polylactic acid (PLA) may be used as a polymer matrix material for electrode components. In order to create one electrode polymer composite, Zn powder and nanoscopic electrically conductive carbon materials may be introduced into the polymer matrix, via solution route (as described below). For example, the PLA-containing powder or granules may be dissolved in a low-boiling solvent such as methylene chloride, chloroform, etc., to form a polymer solution. The Zn powder, nanoscopic electrically conductive carbon materials, and any other optional ingredients (such as $SiO_2$, $TiO_2$, surfactants, etc.) may be incorporated and substantially uniformly dispersed in the polymer matrix by, for example, ultrasonication or mechanical agitation. A plasticizer such as tributyl citrate, etc., may then be added to the composition to lower the melting temperature of the composite and thus ease the processing thereof. Upon solvent removal, the resulting polymer composite material may be fed as granules or a powder into an extruder to provide electrode filaments. In a similar fashion, the other electrode polymer composite comprising of the polymer matrix material, nanoscopic electrically conductive carbon materials, $MnO_2$ powder, plasticizer etc., may be manufactured.

In some embodiments of the present invention, the PLA may be used as a polymer matrix material for both electrodes. In order to create an one electrode composite, Zn powder, nanoscopic electrically conductive carbon materials, and any other optional ingredients (such as $SiO_2$, $TiO_2$, surfactants, etc.) may also be incorporated into the polymer matrix via solution route. The PLA powder or granules may again be dissolved in a low-boiling solvent such as methylene chloride, chloroform, etc., to form a polymer solution. The Zn powder, nanoscopic electrically conductive carbon materials, and any other optional ingredients may be substantially uniformly dispersed in the polymer matrix by ultrasonication or mechanical agitation. A plasticizer such as tributyl citrate, etc., may then be added to the composition to again lower the melting temperature of the composite, thus easing the processing thereof. Upon solvent removal, the polymer composite material may be fed as granules of powder into the extruder to provide electrode filaments. In similar fashion, the other electrode polymer composite comprising the polymer matrix material, nanoscopic electrically conductive carbon materials, $MnO_2$ powder, plasticizer, etc., may be manufactured.

In some embodiments of the present invention, the Zn powder or $MnO_2$ powder and nanoscopic electrically conductive carbon materials may be mixed with a dry polymer powder as well as plasticizer, and any other dry ingredients, without using a solvent. The plasticizer may be incorporated into the composite to enable extrusion into a filamentary form. The resulting filaments may then be used to print the respective electrodes of the battery.

In one embodiment, nanoparticles such as of $SiO_2$, $Al_2O_3$, $TiO_2$, etc., may be added to one or both electrodes and electrolyte composition in order to improve the ionic transport and stability of the electrode/electrolyte interface and robustness of the resulting battery.

In some embodiments, the polyvinyl alcohol (PVA) polymer, when used in their unplasticized state, may have a higher degree of crystallinity and thus show little or no thermoplasticity before the occurrence of decomposition that starts at about 170° C. and becomes pronounced ay 200° C. In such embodiments, inclusion plasticizers such as ethylene glycol, trimethylene glycol, propylene glycol, etc., may be appropriate.

In some embodiments, PVA/$ZnCl_2$, PVA/$NH_4Cl$, or PVA/$ZnCl_2$/$NH_4Cl$ blends, hyponic gels based on polyacrylic acid co-polymer (HPG)/$ZnCl_2$, or HPG/$NH_4Cl$ blends, polyethylene oxide (PEO/)$ZnCl_2$/$NH_4Cl$, PEO/$ZnCl_2$, or PEO/$NH_4Cl$ blends may be used as the electrolyte. The polymer blends of PEO with PVA may also be utilized as electrolytes in some embodiments. These blends may be created in the form of filaments, gels, films, etc., to deposit or print the electrolyte component (e.g., layer) of the battery. In embodiments where the filament comprises a combination of PVA and PEO polymers, the addition of plasticizers (e.g., glycerol, etc.) or surfactants (e.g., nonionic hydrophilic polyethylene oxide such as Triton 100X, and nonionic hydrophilic alkyl (e.g., nonyl) phenol ethoxylate surfactants such as Tergitol NP-30, etc.) may be necessary to enable extrusion of the filaments.

In some embodiments the electrolyte framework may be printed solely using a the commercially available PVA filament, but may require an addition of a concentrated aqueous electrolyte solution of $ZnCl_2$, etc., before battery hermetization. Upon swelling in water, the PVA will create thick gel-like structure which provides structural integrity to the completed battery assembly.

In one embodiment of the present invention, the electrode compositions may be enhanced by admixing a material such as $ZnCl_2$ or $NH_4Cl$ directly into the electrode-forming nanoscopic electrically conductive carbon material-polymer composition alone or as a blend with another polymer, such as PVA, thus substantially increasing ionic transport within the bulk of the solid electrodes. In such an embodiment, the battery may be comprised of the following layers: one electrode composite comprising a single polymer or blend as the polymer matrix, Zn nanopowder, one or more nanoscopic electrically conductive carbon materials (including graphene having mono- or multi-layered structures, reduced graphene oxide, carbon fibers, carbon nanotubes, carbon black, etc.), plasticizer, an electrolyte component such as $ZnCl_2$ or $NH_4Cl$, and nanoparticles such as $SiO_2$, $Al_2O_3$, $TiO_2$, etc; the other electrode composite comprising a single polymer or blend as the polymer matrix, $MnO_2$ powder, one or more nanoscopic electrically conductive carbon materials (including graphene having a mono- or multi-layered structures, reduced graphene oxide, carbon-based nanofibers, carbon-based nanotubes, carbon black, etc.), plasticizer, an electrolyte component having $ZnCl_2$ or $NH_4Cl$, Zn acetate (to achieve improved low temperature performance), nanoparticles of $SiO_2$, $Al_2O_3$, $TiO_2$, etc. (the $SiO_2$ may be replaced by $Mg(OH)_2$ where PVA is used, as the acidity of silica may deteriorate thermal stability).

In some embodiments of the present invention, other electrolyte salts such as $ZnBr_2$, $ZnF_2$, $ZnI_2$, $ZnC_4H_4O_6xH_2O$, etc., may also be incorporated into the electrolyte composition.

In some embodiments, carbon dioxide ($CO_2$)-generating compounds, such $CaCO_3$, $MgCO_3$, etc., may be added to the electrode-forming composition and post-treated with heat, microwaves of an energy beam, etc. thus causing the decomposition of aforementioned compounds with $CO_2$ gas evolution, and yielding porous electrode architecture with highly developed surface area.

In embodiments where a gel electrolyte deposition is used, one or more of carboxymethyl cellulose, starches, ethyl cellulose, hydroxyl-ethyl cellulose, methylcellulose polyethylene oxide polyacrylamides, etc., may be used as binders and media for ion transfer.

In other embodiments, nanoscopic electrically conductive carbon materials may be impregnated with, embedded with, decorated with, etc., metallic nanoparticles of one or more metals, such as Pt, Au, Pd, Pt—Ru, etc., by any appropriate technique, thus improving performance of the electrochemical device in some instances.

In one embodiment of the present invention, lithium salt-containing electrode compositions may be deposited in the filamentary form by conventional FDM printer techniques to provide a functional Li-ion battery upon completion. These Li-ion batteries may be used as power sources for hybrid electric vehicles, for portable electronic devices due to their long cycle life and high energy density, etc. One such lithium salt which may be used as one of the electrodes is lithium titanate, $Li_4Ti_5O_{12}$ (LTO), which has certain structural advantages manifested in zero-strain insertion ability during charging and discharging, therefore enabling longer-term structural integrity of the electrode, as well as higher safety, environmental friendliness, along with excellent cycle reversibility. Batteries using lithium ferrous phosphate, $LiFePO_4$ (LFP) as an electrode material may have a moderate operating voltage, higher energy storage capacity, higher discharge power, a faster charging and long cycle life, as well as stability when subjected to higher temperatures or a higher thermal environment, making this electrode material suitable for extrudable electrode composites. As LTO and LFP are oxides and may therefore be less conductive, incorporation of more highly conductive components in the LTO and LFP electrode compositions may significantly improve electron transport by providing a electrically conductive framework which improves battery performance, as well as providing an additional structural framework. For example, doping with aluminum, niobium or zirconium may boost the conductivity of LTO and LFP electrodes as well.

In one embodiment of present invention, one electrode composite material may comprise a blend of polymer matrix, $LiTi_5O_{12}$ (LTO) powder, nanoscopic electrically conductive carbon materials, plasticizer, as well as other optional ingredients. The other electrode composite may comprise a polymer matrix, $LiFePO_4$ (LFP), nanoscopic electrically conductive carbon materials, plasticizer, as well as other optional ingredients.

In one embodiment, the electrolyte may be prepared form mixture of polyethylene oxide (PEO), and lithium bis-trifluoromethanesulfonimide, $(CF_3SO_2)_2N^-$ $Li^+$. The mixture of PEO and $(CF_3SO_2)_2N^-$ $Li^+$ may be ideal for FDM printable electrolyte composites due to good balance of ionic conductivity and longer-term stability of $(CF_3SO_2)_2N^-Li^+$, including thermal, hydrolytic and electrochemical stability, with PEO's lower melting point. In some instances, addition of plasticizer such as glycerol may be necessary to improve stability of the electrode composite by decreasing its extrusion temperature. In such instances, an electrolyte-containing filament may be used to print the ion-conducting layer of the battery. Polyethylene oxide (PEO) resin with molecular weight above 7,000 may be suitable to be extruded in such filamentary forms. PVA also be may be used alone or as a blend with PEO for such purposes.

In one embodiment of the present invention, an electrolyte battery layer may be deposited in the form of gel, thick dispersion, or paste. In such instances, an electrolyte composite may be comprised of $Li_2SiO_3$, lithium phosphorous oxynitride (LIPON), or a sodium superionic conductor (NASICON)-type material consisting of $Li_2O$—$Al_2O_3$—$SiO_2$—$P_2O_5$—$TiO_2$, may be used as a solid electrolyte system with such Li+ ion conductors in the polymer matrix or bonded by one or more of carboxymethyl cellulose, starches, ethyl cellulose, hydroxyl-ethyl cellulose, methylcellulose polyethylene oxide polyacrylamides, etc., and deposited in a gel or paste form to comprise an electrolyte.

In various embodiments of this invention, the polymer matrix composites may be blended by means of ultrasonic devices, cryogenic crushers, kneaders, extruders, ball milling, high-shear mixers and such as well as manually.

Nonwoven polyethylene (PE) separators (as well as separators prepared from similar higher melting materials) may be used, which melt at ~140° C. and may provide safety benefits by shutting down the rush of current in the case of abuse.

In another embodiment, the electrode deposition may be carried out by conventional Fused Filament Fabrication (FFF) forming. In this embodiment, the electrode may be comprised of single or multiple nanoscopic electrically conductive carbon materials, along with at least a two component polymer mixture where one component may provide the structural integrity and support to the electrode while the other may be transformed later to allow formation of the highly branched channels within the electrode composite. Such a combination may include one or more of: PLA, ABS, PCL, PEO, PVA, PMMA, HIPS, polypropylene (PP), polycarbonate (PC), nylon, etc., polymers, in any combination.

It some embodiments admixing of various nanoparticles ($SiO_2$, $TiO_2$, $Al_2O_3$, etc.) may be useful in terms of enhancing the mechanical properties of the electrode material along with improved suitability of the electrode-electrolyte interface.

In some embodiments, a porous electrode geometry may be also achieved by utilizing SLS printing techniques. In such embodiments, the nanoscopic electrically conductive carbon material-containing polymer nanocomposite powder may be mixed with a water soluble additive (salt, polymer, etc.), sintered, and subsequently post-processed in water, thus yielding a highly porous electrode architecture.

In some embodiments, a polymer electrolyte may be delivered via a syringe in a FDM printer compatible fixture along with the electrodes. A poly(vinylidene fluoride-co-hexafluoropropylene) polymer blend matrix loaded with $LiClO_4$ in ethylene carbonate/diethylene carbonate may be used as such an electrolyte system. In another embodiment, a poly(ethylene glycol) diacrylate/$LiClO_4$/γ-butyrolactone electrolyte system may be used. The gel polymer electrolyte may be also comprised of one or more of the following polymers: polypropylene, poly(vinylidene)difluoride, poly (tetrafluoroethylene), PEO, polyaniline (PANT), poly(m-ethyl methacrylate) (PMMA), PVA, etc.

The electrolyte may also include one or more of the following salts: $LiClO_4$, $LiPF_6$, $LiBF_4$, $LiCF_3SO_3$, $LiN(CF_3SO_2)_2$, etc., in one or more aprotic solvents. Aqueous solutions of $H_2SO_4$, $H_3PO_4$, KOH, etc., may also be employed in some embodiments as well as tetraethylammonium salts such as $C_8H_{20}N^+(PF_6)^-$, $C_8H_{20}N^+(BF_4)^-$, etc., in aprotic solvents. Aprotic solvents suitable for this purpose may include one or more of: propylene carbonate, dimethyl sulfoxide (DMSO), dimethyl formamide (DMF), ethyl cellulose (EC), diethyl carbonate (DEC), $CH_3CN$, γ-butyrolactone, sulfolane, etc.

In some embodiments, a gel electrolyte may be diluted or suspended in a small volume of the low boiling point solvent, such as THE, acetone, an alcohol (e.g., ethanol, methanol, isopropanol, etc.), etc., for ease of delivery.

In another embodiment, the electrolyte may be polymerized in situ by using thermal or photo initiators, such as: polyethylene (glycol) diacrylate (PEGDA)/1M $LiClO_4$/γ-butyrolactone/azobisisobutyronitrile (AIBN), or PEGDA/4-(2-hydroxyethyl)-1-piperazineethanesulfonic acid (HEPES)/phenyl-acetophenone. Various polymerization initiators may be employed, for example: eosin Y with triethanolamine and 1-vinyl-2-pyrolidone; 1-[4-(2-hydrohyethoxy)-phenyl]-2-hydroxy-2-methyl-1-propane-1-one, etc. Nanoparticles such as $Al_2O_3$, $TiO_2$, $CrO_2$, $SiO_2$, etc., may also be embedded to improve stability at the electrode-electrolyte barrier.

In one embodiment of the present invention, the electrolyte may be partially 3D printed, along with or stepwise with the electrode deposition. In such an embodiment, the printed framework may be comprised of, for example, PVA and PEO polymers, including their composites/blends which may or may not contain admixed salts embedded in the filament and which may be post-treated later with an aqueous acid solution which then forms a gel electrolyte upon completion.

An embodiment of battery prepared by a three-dimensional (3D) printing technique is illustrated schematically in FIG. 1 and is indicated generally as 100. Battery 100 includes an upper current collector, indicated generally as 104, and a bottom current collector, indicated generally as 108. Battery 100 further includes an upper electrode (which may be the anode), indicated generally as 112 adjacent current collector 104, as well as lower electrode (which may be the cathode), indicated generally as 116. Positioned between upper electrode 112 and lower electrode 116 is the body of the battery (adjacent lower electrode 116), indicated generally as 120, and a separator/electrolyte matrix component (adjacent upper electrode 112), indicated generally as 124. Component 124 swells to form a gel-like structure upon the addition of the electrolyte, thus serving as an ion-conducting medium and as separator simultaneously.

Figure 2:
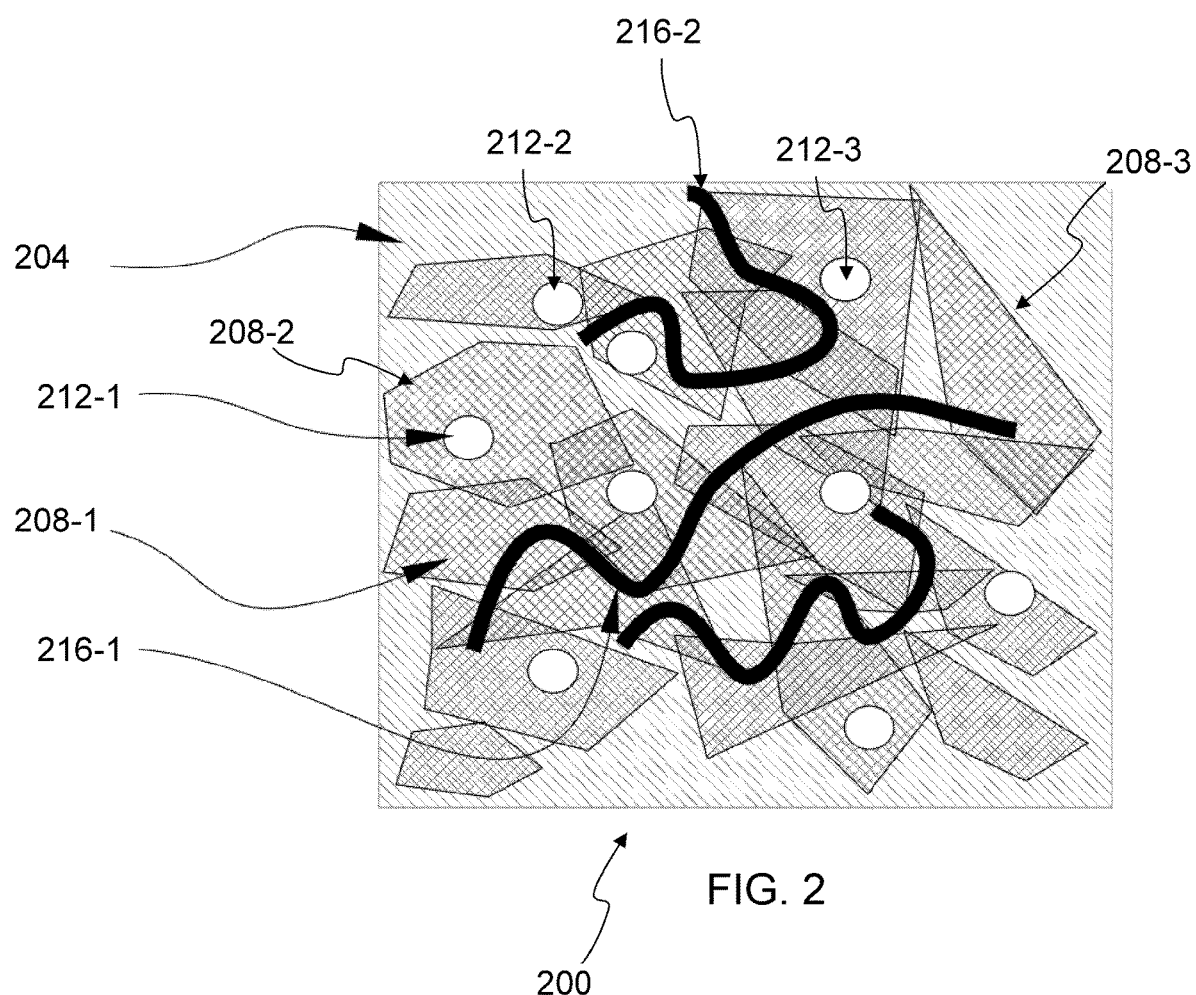
FIG. 2 is a schematic illustration of an embodiment of an electrode composite which may be used to provide one or more of the electrodes of the battery of FIG. 1.

An embodiment of an electrode composite which may be used for one or more of electrodes 112 and 116 of FIG. 1 is schematically illustrated in FIG. 2, and indicated generally as 200. Composite 200 includes a polymer matrix, indicated generally as 204. Within polymer matrix 204 are electrically conductive graphene nanoplatelets, of which three are indicated as 208-1, 208-2, and 208-3. Within polymer matrix 204 are also electrochemically active nanoparticles, of which three are indicated as 212-1, 212-2, and 212-3. Also within polymer matrix 204 are a few carbon fibers, of which two are indicated as 216-1 and 216-2.

Exemplification of FDM, SLS, and other 3D printing techniques which may be useful for printing polymer matrix composites to provide components (e.g., electrodes) or entire electrochemical devices, such as batteries, supercapacitors, etc., are described below:

Fused Deposition Modeling (FDM) and Three-Dimensional (3D) Printing.

Both methods are additive manufacturing (AM) techniques and may be based on the extrusion of polymer-based filament (at temperatures around its melting point transition) through a nozzle onto a supporting substrate. The precisely controlled (computer controlled) motion of the nozzle on 3-axes allows polymer deposition in three dimensions. FDM differs from 3D printing in using a supportive polymer structure, which may be removed after the model is complete, while 3D printing methods may not have to use such supports. The polymer nanocomposites may be produced, as described in embodiments of the present invention which may be conductive, reinforced, etc., in the form of filaments, pellets, etc., to fit currently available 3D/FDM printers with their compositions altered to allow extrusion of these filaments at conditions used in those printers (e.g., by using plasticizers and other additives).

Selective laser sintering (SLS). SLS is another additive manufacturing method and similar to 3D printing which enables the production of complex 3D structures using polymer matrix precursors. The polymer matrix precursor may be used in the form of a powdered material which may be heated in the focal point of a laser source, resulting in the local melting and sintering polymer particles together. The movement of the laser focal point in the XY plane, together with the movement of the base containing the precursor in Z direction, may result in the formation of a 3D object. The properties of the resulting polymer composites may be optimized for use in an SLS process by using other additives, such as plasticizers, etc.

Embodiments of the present invention may provide printed electronic power supplies why may be utilized separately or may be a functional part of other extended printed functional assemblies. The ability to print energy sources such as batteries and supercapacitors may be useful for remote locations to be self-sufficient and to able to generate their own energy and gadgets, making 3D printed energy sources will ideal for such uses. Reductions or total replacement of metals in composites used for such battery assemblies may make them lightweight, and thus useful for space and aircraft applications. Some potential applications for printable power sources include advertising, car batteries, and medical devices. Use of nanoscopic electrically conductive carbon materials may also prevent deterioration of electrode material upon charge/discharge cycles, thus being particularly beneficial for Li-ion battery embodiments.

This application may incorporate material which is subject to copyright protection. The copyright owner has no objection to the facsimile reproduction by anyone of this application or any portion of this disclosure, as it appears in the Patent and Trademark Office patent/patent application file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the scope of the present invention should not be limited by any of the above described exemplary embodiments.

In addition, it should also be understood that any figures in the drawings that highlight any functionality and/or advantages, are presented herein for illustrative purposes only. The disclosed architecture is sufficiently flexible and configurable, such that it may be utilized in ways other than those that may be shown. For example, the steps listed in any flowchart may be re-ordered or only optionally used in some embodiments.

Further, the purpose of the Abstract of the Disclosure in this application is to enable the U.S. Patent and Trademark Office, as well as the public generally, including any scientists, engineers and practitioners in the art who are not familiar with patent or other legal terms or phraseology, to determine quickly from a cursory inspection the nature and essence of the technical disclosure of the application. Accordingly, while the Abstract of the Disclosure may be used to provide enablement for the following claims, it is not intended to be limiting as to the scope of those claims in any way.

Finally, it is the applicants' intent that only claims that include the express language "means for" or "step for" be interpreted under 35 U.S.C. § 112, paragraph 6. Claims that do not expressly include the phrase "means for" or "step for" are not to be interpreted as being within the purview of 35 U.S.C. § 112, paragraph 6.

What is claimed is:

1. An electrochemical device comprising an electrochemical cell, each electrochemical cell including two half-cells, each half-cell comprising:
   an electrode comprising:
      a thermoplastic polymer matrix;
      at least one nanoscopic electrically conductive carbon material having a size in at least one dimension of from about 1 to about 100 nanometers and substantially uniformly dispersed in the thermoplastic polymer matrix; and at least one electrochemically active material substantially uniformly dispersed in the thermoplastic polymer matrix, the at least one electrochemically active material being one or more of: zinc; copper; aluminum; lead; cadmium; silver mercury, lithium, magnesium; manganese oxide; lithium iron phosphate (LiFePO$_4$); lithium titanate (Li$_4$Ti$_5$O$_{12}$); lithium cobalt oxide (LiCoO$_2$); lithium manganese oxide (LiMnO); lithium nickel manganese cobalt oxide (LiNiMnCoO$_2$); lithium nickel cobalt aluminum oxide (LiNiCoAlO$_3$); lithium manganese oxide (LiMn$_2$O$_4$); lithium nickel cobalt aluminum oxide (LiNi$_{0.8}$Co$_{0.15}$Al$_{0.05}$O$_2$); or lithium nickel manganese cobalt oxide (LiNi$_{1/3}$Mn$_{1/3}$Co$_{1/3}$O$_2$); and at least one electrolyte in contact with the electrode in each half-cell;

wherein the electrode of one of the half-cells is the cathode, and wherein the electrode of the other of the half cells is the anode.

2. The device of claim 1, wherein the at least one nanoscopic electrically conductive carbon material comprises one or more of: graphene; graphene-like materials; carbon-based nanofibers; or carbon-based nanotubes.

3. The device of claim 2, wherein the at least one nanoscopic electrically conductive carbon material is one or more of: graphene nanoplatelets; carbon-based nanofibers; or carbon-based nanotubes.

4. The device of claim 1, wherein the thermoplastic polymer matrix comprises one or more of the following polymers: acrylate polymers; methyl methacrylate polymers; acrylate and methacrylate copolymers; polylactic acid (PLA) polymers; polyhydroxyalkanoate (PHA) polymers; polycaprolactone (PCL) polymers; polyglycolic acid polymers; acrylonitrile-butadiene-styrene (ABS) polymers; polyvinylidene fluoride polymers; polyurethane polymers; polyolefin polymers; polyester polymers; polyamide polymers; polyethylene oxide (PEO) polymers; polyvinyl alcohol (PVA) polymers; or high impact polystyrene polymers.

5. The device of claim 4, wherein the thermoplastic polymer matrix comprises one or more of the following polymers: polylactic acid (PLA) polymers; polyethylene oxide (PEO) polymer; or polyvinyl alcohol (PVA) polymers.

6. The device of claim 1, wherein the at least one electrochemically active material is one or more of: zinc; copper; aluminum; lead; cadmium; silver mercury; lithium; magnesium; or manganese oxide (MnO$_2$).

7. The device of claim 6, wherein the at least one electrochemically active material is one or more of: zinc powder; or manganese oxide (MnO$_2$) nanoparticles.

8. The device of claim 1, wherein the at least one electrochemically active material is one or more of: lithium iron phosphate (LiFePO$_4$), lithium titanate (Li$_4$Ti$_5$O$_{12}$), lithium cobalt oxide (LiCoO$_2$), lithium manganese oxide (LiMnO), lithium nickel manganese cobalt oxide (LiNiMnCoO$_2$), lithium nickel cobalt aluminum oxide (LiNiCoAlO$_3$), lithium manganese oxide (LiMn$_2$O$_4$), lithium nickel cobalt aluminum oxide (LiNi$_{0.8}$Co$_{0.15}$Al$_{0.05}$O$_2$), or lithium nickel manganese cobalt oxide (LiNi$_{1/3}$Mn$_{1/3}$Co$_{1/3}$O$_2$).

9. The device of claim 8, wherein the at least one electrochemically active material is one or more of: lithium titanate (Li$_4$Ti$_5$O$_{12}$); or lithium iron phosphate (LiFePO$_4$).

10. The device of claim 1, wherein each electrode comprises one or more filaments, gels, powders, pellets, or films.

11. The device of claim 10, wherein each electrode comprises one or more filaments.

12. The device of claim 1, wherein the thermoplastic polymer matrix further comprises a plasticizer, wherein the plasticizer is one or more of: tributyl citrate, diethyl phthalate, acetyl tributyl citrate, glycerol triacetate, glycerol tripropionate, triethyl citrate, acetyl triethyl citrate, triacetin, triphenyl phosphate, resorcinol bis(diphenyl phosphate), oligomeric phosphate, long chain fatty acid esters, aromatic sulfonamides, hydrocarbon processing oil, glycerol, ethylene glycol, propylene glycol, trimethylene glycol, epoxy-functionalized propylene glycol, polyethylene glycol, polypropylene glycol, partial fatty acid ester, glucose monoester, epoxidized soybean oil, acetylated coconut oil, linseed oil, or epoxidized linseed oil.

13. The device of claim 12, wherein the plasticizer comprises tributyl citrate.

14. The device of claim 1, wherein the at least one electrolyte comprises one or more of: ZnCl$_2$; NH$_4$Cl; SiO$_2$; Al$_2$O$_3$; TiO$_2$; or Mg(OH)$_2$.

15. The device of claim 14, wherein the electrolyte comprises a solid polymer containing one or more of: ZnCl$_2$; NH$_4$Cl; SiO$_2$; Al$_2$O$_3$; TiO$_2$; or Mg(OH)$_2$.

16. The device of claim 1, wherein the each electrode comprises the at least one nanoscopic electrically conductive carbon material in an amount in the range of from about 5 to about 40% by weight of the thermoplastic polymer matrix and the at least one electrochemically active material in an amount in the range of from about 5 to about 50% by weight of the thermoplastic polymer matrix.

17. The device of claim 16, wherein the each electrode comprises the at least one nanoscopic electrically conductive carbon material in an amount in the range of from about 10 to about 30% by weight of the thermoplastic polymer matrix and the at least one electrochemically active material in an amount in the range of from about 10 to about 30% by weight of the thermoplastic polymer matrix.

18. The device of claim 1, wherein the electrochemical cell further comprises an ion permeable separator positioned between the two electrodes.

19. The device of claim 3, wherein the at least one nanoscopic electrically conductive carbon material are graphene nanoplatelets.

20. The device of claim 7, wherein the at least one electrochemically active material is zinc powder.

21. An electrochemical device comprising an electrochemical cell, each electrochemical cell including two half-cells, each half-cell comprising:

an electrode comprising:
 a thermoplastic polymer matrix;
 at least one nanoscopic electrically conductive carbon material in an amount in the range of from about 5 to about 40% by weight of the thermoplastic polymer matrix having size in at least one dimension of from about 1 to about 100 nanometers and substantially uniformly dispersed in the thermoplastic polymer matrix in an amount in the range of from about 5 to about 50% by weight of the thermoplastic polymer matrix, the at least one nanoscopic electrically conductive carbon material being one or more of: graphene nanoplatelets; functionalized graphene nanoplatelets; graphene oxide nanoplatelets; or partially reduced graphene oxide nanoplatelets; and
 at least one electrochemically active material substantially uniformly dispersed in the thermoplastic polymer matrix in an amount in the range of from about 5 to about 50% by weight of the polymer matrix, the at least one electrochemically active material is one or more of: zinc; copper; aluminum; lead; cadmium; silver mercury, lithium, magnesium; manganese oxide; lithium iron phosphate (LiFePO$_4$); lithium titanate (Li$_4$Ti$_5$O$_{12}$); lithium cobalt oxide (LiCoO$_2$); lithium manganese oxide (LiMnO); lithium nickel manganese cobalt oxide (LiNiMnCoO$_2$); lithium nickel cobalt aluminum oxide (LiNiCoAlO$_3$); lithium manganese oxide (LiMn$_2$O$_4$); lithium nickel cobalt aluminum oxide (LiNi$_{0.8}$Co$_{0.15}$Al$_{0.05}$O$_2$); or lithium nickel manganese cobalt oxide (LiNi$_{1/3}$Mn$_{1/3}$Co$_{1/3}$O$_2$); and at least one electrolyte in contact with the electrode in each half-cell;

wherein the electrode of one of the half-cells is the cathode, and wherein the electrode of the other of the half cells is the anode.

22. The device of claim 21, wherein the thermoplastic polymer matrix comprises one or more of the following polymers: acrylate polymers; methyl methacrylate polymers; acrylate and methacrylate copolymers; polylactic acid (PLA) polymers; polyhydroxyalkanoate (PHA) polymers; polycaprolactone (PCL) polymers; polyglycolic acid polymers; acrylonitrile-butadiene-styrene (ABS) polymers; polyvinylidene fluoride polymers; polyurethane polymers; polyolefin polymers; polyester polymers; polyamide polymers; polyethylene oxide (PEO) polymers; polyvinyl alcohol (PVA) polymers; or high impact polystyrene polymers.

23. The device of claim 22, wherein the thermoplastic polymer matrix comprises one or more of the following polymers: polylactic acid (PLA) polymers; polyethylene oxide (PEO) polymer; or polyvinyl alcohol (PVA) polymers.

24. The device of claim 21, wherein the at least one electrochemically active material is one or more of: zinc; copper; aluminum; lead; cadmium; silver mercury; lithium; magnesium; or manganese oxide (MnO$_2$).

25. The device of claim 24, wherein the at least one electrochemically active material is one or more of: zinc powder; or manganese oxide (MnO$_2$) nanoparticles.

26. The device of claim 21, wherein the at least one electrochemically active material is one or more of: lithium iron phosphate (LiFePO$_4$); lithium titanate (Li$_4$Ti$_5$O$_{12}$); lithium cobalt oxide (LiCoO$_2$); lithium manganese oxide (LiMnO); lithium nickel manganese cobalt oxide (LiNiMnCoO$_2$); lithium nickel cobalt aluminum oxide (LiNiCoAlO$_3$); lithium manganese oxide (LiMn$_2$O$_4$); lithium nickel cobalt aluminum oxide (LiNi$_{0.8}$Co$_{0.15}$Al$_{0.05}$O$_2$); or lithium nickel manganese cobalt oxide (LiNi$_{1/3}$Mn$_{1/3}$Co$_{1/3}$O$_2$).

27. The device of claim 26, wherein the at least one electrochemically active material is one or more of: lithium titanate (Li$_4$Ti$_5$O$_{12}$); or lithium iron phosphate (LiFePO$_4$).

28. The device of claim 21, wherein each electrode comprises one or more filaments, gels, powders, pellets, or films.

29. The device of claim 28, wherein each electrode comprises one or more filaments.

30. The device of claim 21, wherein the thermoplastic polymer matrix further comprises a plasticizer, wherein the plasticizer is one or more of: tributyl citrate, diethyl phthalate, acetyl tributyl citrate, glycerol triacetate, glycerol tripropionate, triethyl citrate, acetyl triethyl citrate, triacetin, triphenyl phosphate, resorcinol bis(diphenyl phosphate), oligomeric phosphate, long chain fatty acid esters, aromatic sulfonamides, hydrocarbon processing oil, glycerol, ethylene glycol, propylene glycol, trimethylene glycol, epoxy-functionalized propylene glycol, polyethylene glycol, polypropylene glycol, partial fatty acid ester, glucose monoester, epoxidized soybean oil, acetylated coconut oil, linseed oil, or epoxidized linseed oil.

31. The device of claim 30, wherein the plasticizer comprises tributyl citrate.

32. The device of claim 21, wherein the at least one electrolyte comprises one or more of: ZnCl$_2$; NH$_4$Cl; SiO$_2$; Al$_2$O$_3$; TiO$_2$; or Mg(OH)$_2$.

33. The device of claim 31, wherein the electrolyte comprises a solid polymer containing one or more of: ZnCl$_2$; NH$_4$Cl; SiO$_2$; Al$_2$O$_3$; TiO$_2$; or Mg(OH)$_2$.

34. The device of claim 21, wherein each electrode comprises the at least one nanoscopic electrically conductive carbon material in an amount in the range of from about 10 to about 30% by weight of the thermoplastic polymer matrix and the at least one electrochemically active material in an amount in the range of from about 10 to about 30% by weight of the polymer matrix.

35. The device of claim 21, wherein the at least one nanoscopic electrically conductive carbon material are graphene nanoplatelets.

* * * * *